United States Patent
Quinn et al.

(10) Patent No.: US 7,206,481 B2
(45) Date of Patent: Apr. 17, 2007

(54) FIBER OPTIC CABLES MANUFACTURED AS AN ASSEMBLY AND METHOD FOR MANUFACTURING THE SAME

(75) Inventors: Christopher M. Quinn, Hickory, NC (US); Craig M. Conrad, Hickory, NC (US); David W. Chiasson, Edmonton (CA); Carl M. Whisnant, Jr., Hickory, NC (US)

(73) Assignee: Corning Cable Systems, LLC., Hickory, NC (US)

( * ) Notice: Subject to any disclaimer, the term of this patent is extended or adjusted under 35 U.S.C. 154(b) by 0 days.

(21) Appl. No.: 11/018,268

(22) Filed: Dec. 21, 2004

(65) Prior Publication Data

US 2006/0133746 A1 Jun. 22, 2006

(51) Int. Cl.
*G02B 6/44* (2006.01)

(52) U.S. Cl. .................................. 385/100; 112/113
(58) Field of Classification Search ............... 385/114
See application file for complete search history.

(56) References Cited

U.S. PATENT DOCUMENTS

| | | | | |
|---|---|---|---|---|
| 4,729,628 A | | 3/1988 | Kraft et al. .............. 350/96.23 |
| 5,371,823 A | | 12/1994 | Barrett et al. .............. 385/101 |
| 5,442,722 A | * | 8/1995 | DeCarlo .................. 385/114 |
| 5,982,968 A | * | 11/1999 | Stulpin ..................... 385/114 |
| 6,088,499 A | * | 7/2000 | Newton et al. ............. 385/112 |
| 6,178,277 B1 | * | 1/2001 | Ravela et al. .............. 385/109 |
| 6,249,628 B1 | * | 6/2001 | Rutterman et al. ......... 385/106 |
| 6,295,401 B1 | * | 9/2001 | Rutterman et al. ......... 385/114 |
| 6,321,012 B1 | * | 11/2001 | Shen ......................... 385/106 |
| 6,363,192 B1 | | 3/2002 | Spooner .................... 385/101 |
| 6,370,303 B1 | | 4/2002 | Fitz et al. ................... 385/113 |
| 6,415,085 B1 | * | 7/2002 | Graham et al. ............ 385/102 |
| 6,542,674 B1 | * | 4/2003 | Gimblet .................... 385/113 |
| 6,563,990 B1 | | 5/2003 | Hurley et al. .............. 385/101 |
| 6,792,184 B2 | | 9/2004 | Conrad et al. ............. 385/114 |
| 6,823,120 B2 | | 11/2004 | Hurley et al. .............. 385/112 |
| 6,847,767 B2 | | 1/2005 | Hurley et al. .............. 385/101 |
| 2002/0064356 A1 | * | 5/2002 | Spooner .................... 385/101 |
| 2004/0022512 A1 | * | 2/2004 | Sato et al. .................. 385/128 |

* cited by examiner

*Primary Examiner*—Michelle Connelly-Cushwa
*Assistant Examiner*—Chris H. Chu

(57) ABSTRACT

A plurality of fiber optic cables are manufactured as an assembly of fiber optic cables that are later separated into independent fiber optic cables. A method of manufacturing the fiber optic cable assembly is also described. A jacketing cover is extruded over components of the fiber optic cables with a portion connecting the fiber optic cables, and the fiber optic cables can separated from each other by tearing, cutting, or removing a filling element between the fiber optic cables.

20 Claims, 3 Drawing Sheets

FIBER OPTIC CABLES MANUFACTURED AS AN ASSEMBLY AND METHOD FOR MANUFACTURING THE SAME

FIELD OF INVENTION

The present invention relates to fiber optic cables that are manufactured as an assembly of at least two optical fiber cables and then separated along their entire length to create independent fiber optic cables. The fiber optic cables may be torn, cut, or otherwise separated. The separation of the fiber optic cables may occur during the manufacture of the assembly or as a separate process at a location other than where they are covered with a jacket. The invention reduces the number of manufacturing lines, and hence the capital investment, needed to manufacture multiple fiber optic cables.

BACKGROUND OF THE INVENTION

There are prior art methods and apparatus for manufacturing multiple fiber optic cables, but they require the use of several separate manufacturing lines. The separate lines require a higher capital investment for the additional equipment and also an increased expense for a larger number of employees to monitor and attend to the separate manufacturing lines. Accordingly, the present invention is directed to fiber optic cables and a method of manufacturing the fiber optic cables that substantially obviates one or more of the problems and disadvantages in the prior art. Additional features and advantages of the invention will be set forth in the description that follows, and in part will be apparent from the description, or may be learned by practice of the invention. The objectives and other advantages of the invention will be realized and attained by the apparatus and process particularly pointed out in the written description and claims, as well as the appended drawings.

SUMMARY OF THE INVENTION

To achieve these and other advantages and in accordance with the purpose of the invention as embodied and broadly described herein, the invention is directed to a method of making at least two independent fiber optic cables, the process includes the steps of feeding a plurality of components for making at least two independent fiber optic cables into a single extrusion cross-head, extruding a jacket covering over the plurality of components thereby making an assembly of at least two fiber optic cables simultaneously with at least a portion of the jacket covering connecting the at least two fiber optic cables, and separating the assembly into at least two independent fiber optic cables along the entire length of the assembly, thereby creating at least two independent fiber optic cables.

In yet another aspect, the present invention is also directed to a method of making at least two fiber optic cables that includes the steps of providing a plurality of components to make the at least two fiber optic cables, extruding a jacket covering over the plurality of components using a common extrusion head thereby making an assembly, the jacket covering of the assembly connecting the at least two fiber optic cables, taking up the assembly on a single reel, and separating the assembly along its entire length, thereby forming the at least two fiber optic cables.

In still another aspect, the present invention is directed to at least two independent fiber optic cables that include at least one optical fiber, at least one strength element, at least one water-swellable component, and a jacket covering, the at least two fiber optic cables being manufactured by the process that includes the steps of providing the at least one optical fiber, the at least one strength element, and the at least one water-swellable component for each of the at least two independent fiber optic cables, wherein the at least one water-swellable component has a length that is longer than the at least one optical fiber, jacketing the at least one optical fiber, the at least one strength element, and the at least one water-swellable component of each of the fiber optic cables simultaneously, the fiber optic cables being attached to at least one other fiber optic cable by a portion of the jacket covering, wherein the step of jacketing includes passing the optical fibers, strength elements, and water-swellable component for each of the fiber optic cables through a single extrusion die, and separating the fiber optic cables along their length, thereby producing at least two independent fiber optic cables.

It is to be understood that the foregoing general description and the following detailed description are exemplary and explanatory and are intended to provide further explanation of the invention as claimed. The accompanying drawings are included to provide a further understanding of the invention and are incorporated in and constitute a part of the specification. The drawings illustrate several embodiments of the invention and together with the description serve to explain the principles of the invention.

DETAILED DESCRIPTION OF THE INVENTION

Figure 1:
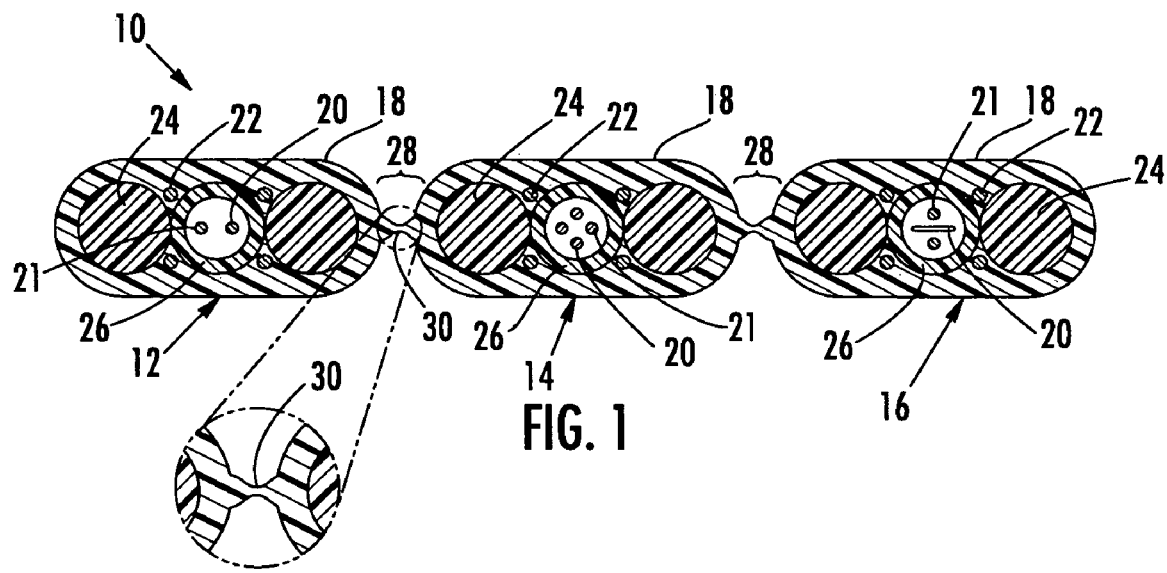
FIG. 1 is a cross-section of one embodiment of a fiber optic cable assembly according to the present invention.

A first embodiment of an assembly 10 of fiber optic cables is illustrated in FIG. 1. The assembly 10 is illustrated with three fiber optic cables 12,14,16. However, the assembly 10 may have as few as two fiber optic cables or many more fiber optic cables, as will be explained in more detail below. The fiber optic cables 12,14,16 are illustrated as flat drop cables made by the assignee of the present invention, Corning Cable Systems of Hickory, N.C. However, the fiber optic cables 12,14,16 may also be other appropriate fiber optic cables. In particular, each of the fiber optic cables 12,14,16 preferably has a jacket covering 18, at least one optical fiber 20, at least one water-swellable component 21, and at least one strength element such as strength member 22 or strength component 24. As used herein, strength member means a strength element that essentially lacks anti-buckling strength such as aramid fibers and/or other tensile yarns and strength component means a strength element that has anti-buckling strength such as a rigid glass-reinforced plastic rod or a coated glass yarn. The optical fibers 20 may be contained within a buffer tube 26 within the fiber optic cables as shown; however, the concepts of the invention are also applicable to tubeless fiber optic cable designs. The water-swellable component 21 is preferably a water-swellable yarn or tape having a super-absorbent polymer (SAP), but may be any cable component that includes a water-swellable material or coating. In one embodiment, water-swellable component 21 such as a yarn is preferably longer than the optical fiber 20 of its respective cable as disclosed in U.S. patent application Ser. No. 10/692,492 filed on Oct. 24, 2003, the disclosure of which is incorporated herein by reference. As shown, cables 12, 14, 16 are all dielectric designs, but other configurations can include conductive elements such as steel strength components, an armor layer, or a copper toning element. Likewise, the cables can include other suitable cable components such as a thixotropic material for water-blocking, a ripcord, and/or one or more an electrical conductors.

The jacket covering 18 is preferably a polymer material such as a polyethylene outer covering that is extruded about the components of each of the fiber optic cables (e.g., at least one optical fiber 20, at least one water-swellable component 21, and at least one strength element 22 or 24). However, any appropriate material for the jacket covering may be used. It should also be noted that the specific components of the fiber optic cables are not important. Jacket covering 18, which is integrally formed around each the fiber optic cables in the assembly 10 in a single extrusion head, has a portion 28 that connects adjacent fiber optic cables 12,14,16. The portion 28 connecting the individual fiber optic cables is designed to be easily broken, cut or otherwise separated to allow the fiber optic cables to become independent fiber optic cables. In the embodiment illustrated in FIG. 1, the portion 28 has a weld line 30 which has a weakened bond compared with the surrounding material, thereby making it easier to tear or use a sharp object to separate the fiber optic cables from one another. The splitting and then recombining the flow of the extruded jacket covering near the exit of the extrusion head will create the weld line.

Figure 2:
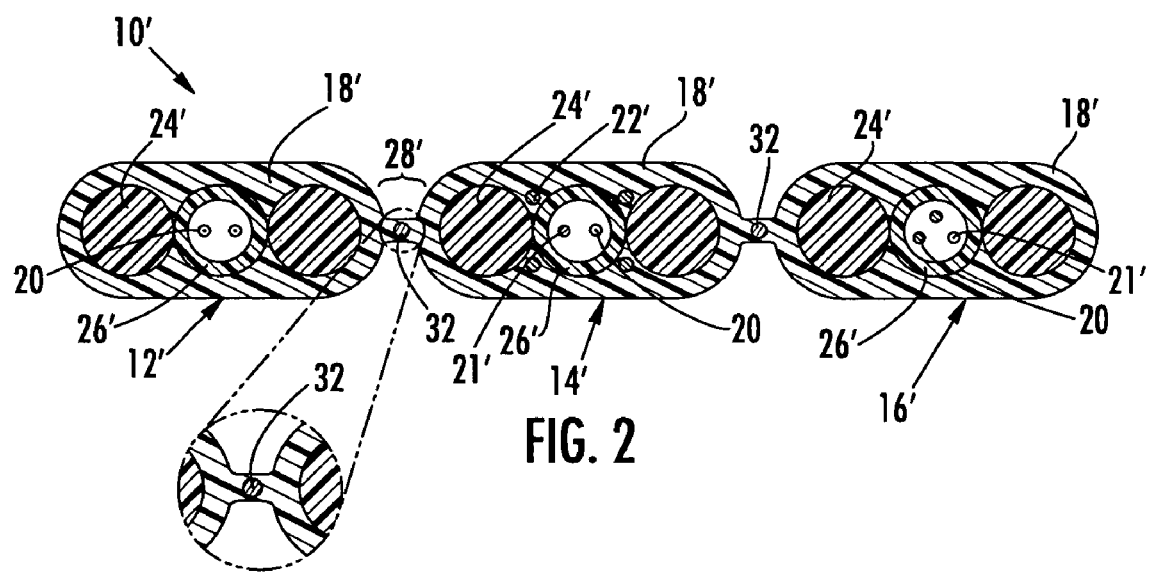
FIG. 2 is a cross-section of another embodiment of a fiber optic cable assembly according to the present invention.

Another embodiment of the present invention is illustrated in FIG. 2. The fiber optic cables 12',14',16' of assembly 10' are the same as that described above in relation to first embodiment. That is, the fiber optic cables 12',14',16' are illustrated as flat drop cables, but may also be other appropriate fiber optic cables such as loose tube cables. As noted above, each of the fiber optic cables 12',14',16' has a jacket covering 18', at least one optical fiber 20', at least one water-swellable component 21', and at least one strength element such as strength member 22' and/or strength component 24'. Again, the optical fibers 20' may be contained within a buffer tube 26' within the fiber optic cables 12',14', 16' if so desired. However, rather than the weld line 30 noted above in connecting portion 28', the fiber optic cables 12',14',16' of the present embodiment have a filling element 32 disposed in portion 28' that assists in separating the fiber optic cables 12',14',16'. The filling element 32 may be a ripcord (i.e., PTFE yarn strand) or any other flexible member that will release the fiber optic cables 12',14',16'. The filling element 32 should be relatively inexpensive and easily disposed of as it will not remain with either of the fiber optic cables and is meant to be discarded. Separation of the independent cables occurs by simply pulling the filling element 32 from portion 28, which preferably extends beyond the ends of assembly 10' to allow easy access to the filling element 32, thereby tearing the covering 18' and separating the fiber optic cables 12',14',16' from one another. Jacket covering 18' over the filling element 32 may not be visible, but jacket covering 18' should be sufficiently thin over filling element 32 for allowing easy separation. In preferred embodiments, the residue of portion remaining on the independent cable should be minimal to, for instance, allow for the use of heat shrink tubing for sealing about the cable.

Figure 3:
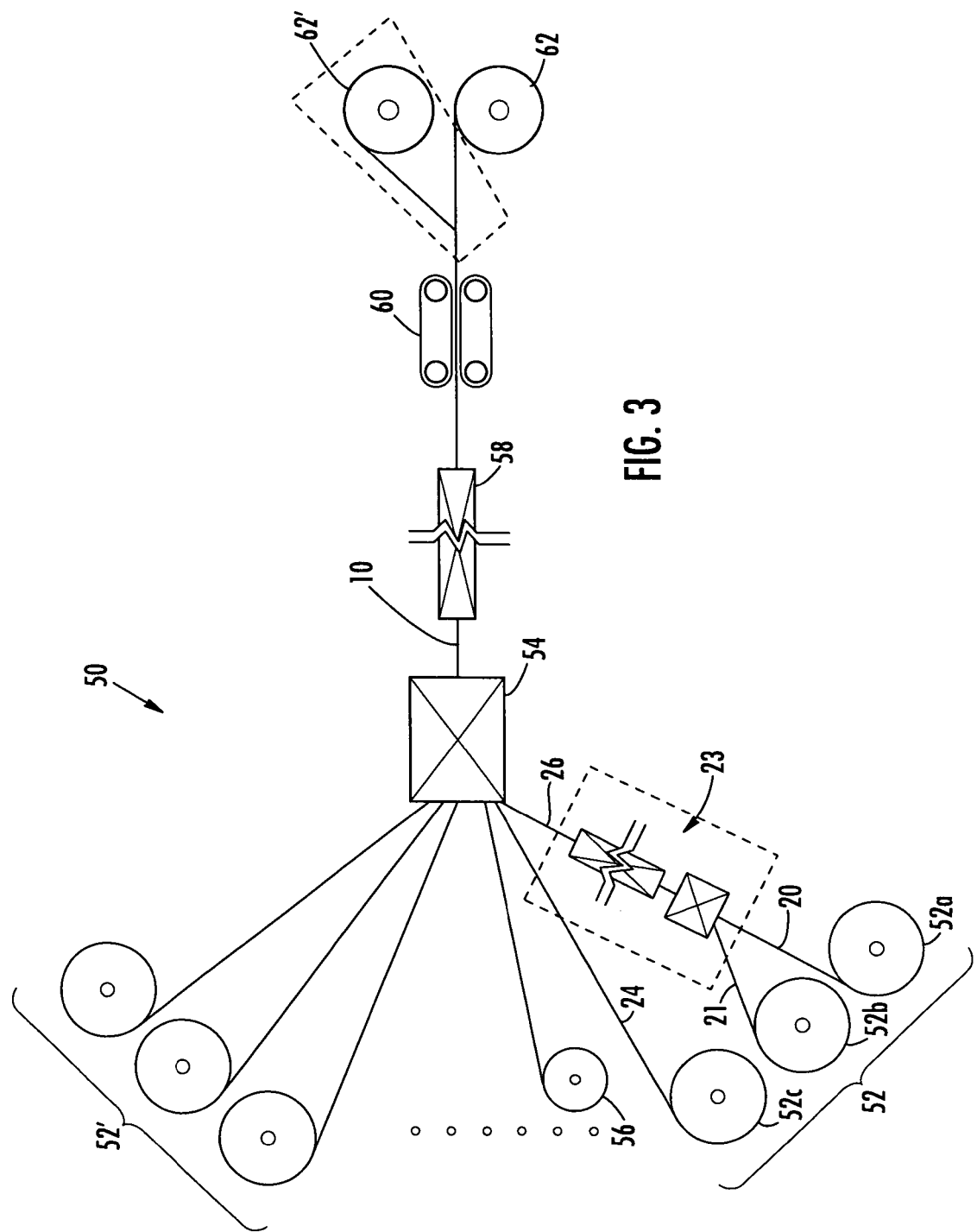
FIG. 3 is a schematic view of an exemplary manufacturing line for use in the manufacture of the embodiments of the present invention.

FIG. 3 illustrates an exemplary manufacturing line 50 for use in making the fiber optic cables according to the present invention. The manufacturing line 50 has a number of groups of pay-off reels 52,52' that correspond to the number of optical fiber cables that are to be included in an assembly. While two groups of pay-off reels 52,52' are illustrated, any number of groups of pay-off reels can be used. For example, in the first embodiment, three groups of pay-reels would be used in the manufacturing line 50 as there are three optical fiber cables included in the assembly 10. Each of the pay-off reels in the groups would correspond to one of the components that are included in the optical fiber cable. For the sake of simplicity, only one reel is shown for each component. For example, in the group 52 of pay-off reels, reel 52a includes the optical fiber 20, reel 52b includes the water-swellable component 21, and reel 52c may include strength element such as strength member 22 or strength component 24, which are paid-off the respective reels and continue to a common cross-head extruder 54 where the covering 18 is applied. Additionally, as shown by a dashed-line box optical fiber 20 and water-swellable component 21 are shown as being optionally fed into a first extruding station 23 where buffer tube 26 is extruded about the same. Alternatively, it is possible to manufacture buffer tube assemblies on a different line and feed the same into common cross-head extruder 54. The components that are to be included in the other fiber optic cables are similarly paid-off from other groups of reels (e.g., group 52'). It is not necessary that the groups of reels contain the same the number of reels (or corresponding number of components) or that the components for the optical fiber cables are the same in each fiber optic cable.

An additional reel 56 may be included to pay-off the filling element 32 that is between each of the fiber optic cables as discussed above in conjunction with the second embodiment. The filling element 32 would then be paid-off to extruder 54 for inclusion in the assembly, if appropriate.

The cross-head extruder 54 extrudes a jacket covering 18,18' about the components paid-off each of the groups of reels, and then the fiber optic cable assembly (10,10') is passed through a water trough 58 to cool jacket covering 18,18'. The assembly of fiber optic cables then preferably passes through pulling device 60 and is wound up on take-up reel 62. The take-up reel 62 with the assembly is then preferably taken to a different location, typically a finishing area, where the assembly is divided into the individual, independent fiber optic cables. However, it is also possible to separate the fiber optic cables into individual, independent fiber optic cables before taking the fiber optic cables up on the respective take-up reels 62,62' as depicted by reel 62' located within the second dashed line box of FIG. 3.

The manufacture of the assembly as described in the manner in conjunction with FIG. 3 above eliminates a number of pieces of equipment that would be required to manufacture the same number of individual fiber optic cables on individual manufacturing lines. For example, for each fiber optic cable that is added to the assembly, one cross-head extruder, one trough, one pulling device, and one take-up reel are eliminated. The combination of fiber optic cables also eliminates the need to have someone attend each of the separate manufacturing lines. Thus, the higher the number of fiber optic cables in each assembly, the greater the advantage in savings of labor and capital. As noted above, it is possible to separate the fiber optic cable assemblies into independent fiber optic cables prior to taking the assembly up on a reel.

Figure 4:
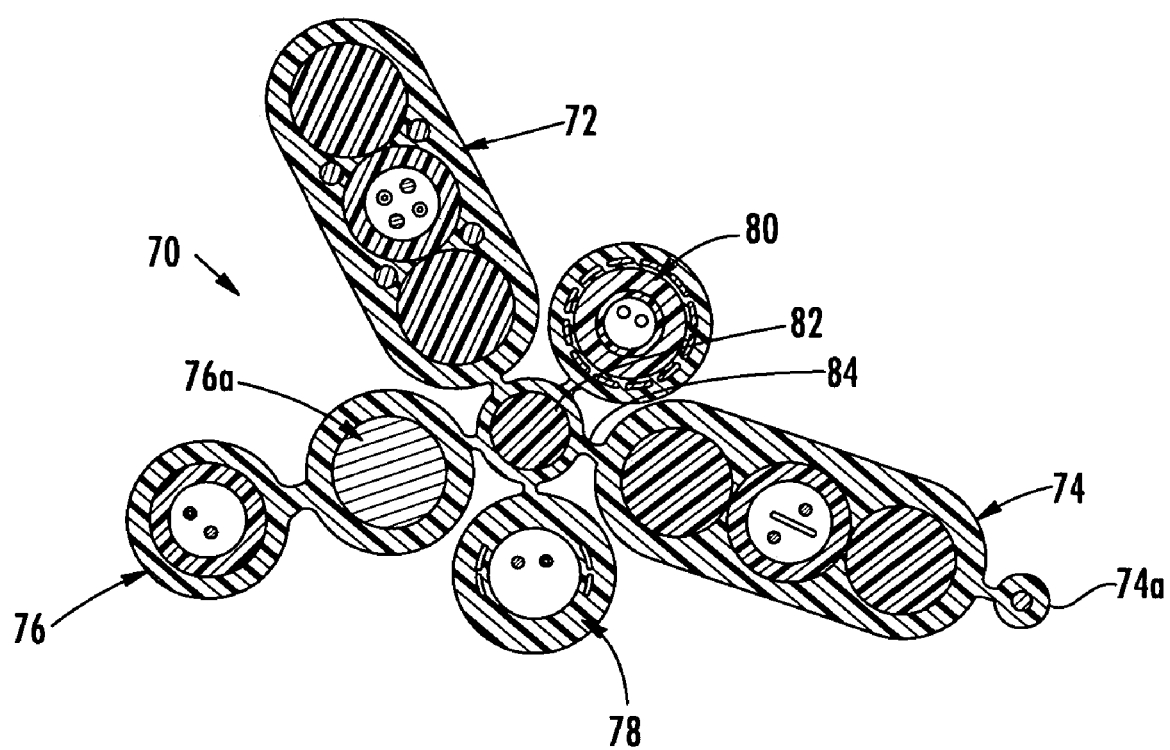
FIG. 4 is a cross-section of another embodiment of a fiber optic cable assembly according to the present invention.

Another embodiment of a fiber optic cable assembly 70 is illustrated in FIG. 4. The fiber optic cable assembly 70 preferably has a number of independent fiber optic cables 72,74,76,78,80 connected to one another by a sacrificial web portion 82 that temporarily connects the cables of assembly 70. The manufacture of the assembly 70 is done in a manner similar to that described in conjunction with the manufacturing line 50 in FIG. 3. However, the geometry of the cross-head extruder will be different since the cables are disposed radially about portion 82. Web portion 82 includes the spoke portions 84 that connect the web portion 82 to the covering of each of the fiber optic cables. As with the above embodiments, a weld line or a filling element may be included within the spoke portions 84 to allow the fiber optic cables to be more easily separated from the web portion 82. Additionally, or alternatively, spoke portion 82 can have a preferential tear portion 84 near the individual cables for aiding separation and minimizing the amount of spoke portion 82 remaining on the cables. During separation, the cables would be separated from the sacrificial web portion 82, which would then typically be discarded once the fiber optic cables are separated therefrom. In other words, if the assembly had m number of independent cables, the separation would occur into m+1 units or portions, i.e., m independent fiber optic cables and one (1) sacrificial web. Using the radial arrangement, generally allows for more cables in one assembly with a relatively small extrusion head assembly.

As illustrated in FIG. 4, the fiber optic cable 72 may have the similar components as with the previous embodiments. However, the fiber optic cables may also include other components and/or other cable configurations as depicted. For example, fiber optic cable 74 has at least two optical fibers 76, at least two strength components 78 and excludes strength members therein, but also includes a lobe 74*a* that has a conductive wire such as copper therein for locating or "toning" the cable in the field. Fiber optic cable 76 is figure-eight fiber optic cable having a messenger section 76*a* with a steel strength component. Likewise, other cable configurations can be included in assemblies of the present invention cables 78 and 80 are round cable only including strength members with cable 78 being a tubeless cable.

It should be noted that assembly 70 illustrated in FIG. 4 depicts five exemplary fiber optic cables any suitable number or types of fiber optic cables fall within the scope of the present invention. For example, there may only be two fiber optic cables that are of the loose tube variety. There may also be more than five cables, and the sacrificial web portion 82 may have a more oval shape rather than the circular shape that is illustrated in FIG. 4. If the sacrificial web portion 82 were larger in circumference but still circular in shape, then more fiber optic cables would also be possible. However, the only limit on the size of the assembly 70 is the size of the extruder and die used for applying the jacket covering of the fiber optic cables.

It will be apparent to those skilled in the art that various modifications and variations can be made in the assembly of drop cables of the present invention without departing from the spirit or scope of the invention. Thus, it is intended that the present invention cover the modifications and variations of this invention provided they come within the scope of the appended claims and their equivalents.

We claim:

1. A method for making at least two independent fiber optic cables, the method including the steps of:
    feeding a plurality of components for making at least two independent fiber optic cables into a single extrusion cross-head;
    extruding a jacket covering over the plurality of components thereby making an assembly of at least two fiber optic cables simultaneously with at least a portion of the jacket covering connecting the at least two fiber optic cables and the jacket covering includes a weld line in the jacket covering of the assembly so that a weakened portion is formed for separating the assembly, wherein each independent fiber optic cable includes at least two strength components; and
    separating the assembly into at least two independent fiber optic cables along the entire length of the assembly, thereby creating at least two independent fiber optic cables.

2. The method of claim 1, further including the step of providing a filling element in the single extrusion cross-head to form a portion of a sacrificial web between the at least two independent fiber optic cables, wherein the assembly includes m number of independent cables and the step of separating forms m+1 portions.

3. The method of claim 1, wherein the weld line in the jacket covering is formed by splitting and recombining at least a portion of the jacket covering flowing near the exit of the single extrusion cross-head so that a weakened portion is formed for separating the assembly.

4. The method of claim 1, wherein the step of separating the at least two fiber optic cables further includes the step of using a single reel for taking up the at least two independent fiber optic cables.

5. The method of claim 1, wherein the step of separating the assembly into at least two independent fiber optic cables is performed at a separate location from the extruding step.

6. The method of claim 1, wherein the step of separating the at least two independent fiber optic cables includes tearing at least a portion of the jacket covering connecting the at least two fiber optic cables, thereby forming at least two independent fiber optic cables.

7. The method of claim 1, wherein the step of separating the at least two independent fiber optic cables includes cutting at least a portion of the covering connecting the at least two fiber optic cables, thereby forming at least two independent fiber optic cables.

8. The method of claim 1, wherein the plurality of components in the step of feeding a plurality of components comprises at least one water-swellable component and at least one optical fiber for each independent fiber optic cable, and the at least one water-swellable component has a length that is longer than the length of the at least one optical fiber.

9. The method of claim 1, wherein the assembly comprises more than two independent fiber optic cables.

10. The method of claim 1, wherein the independent fiber optic cables are formed radially about a middle of the assembly.

11. The independent fiber optic cable of the process of claim 1.

12. The independent fiber optic cables of the process of claim 1, wherein each independent fiber optic cable further includes at least two strength members.

13. A method for making at least two fiber optic cables comprising the steps of:
    providing a plurality of components to make the at least two fiber optic cables;

extruding a jacket covering over the plurality of components using a common extrusion head thereby making an assembly, the jacket covering of the assembly connecting the at least two fiber optic cables, wherein the step of extruding the jacket covering includes forming a weld line in the jacket covering of the assembly so that a weakened portion is formed;

taking up the assembly on a single reel; and separating the assembly along its entire length, thereby forming the at least two fiber optic cables.

14. The method of claim 13, further including the step of providing a filling element to form a portion of a sacrificial web between the at least two independent fiber optic cables.

15. The independent fiber optic cables of the process of claim 13.

16. At least two independent fiber optic cables comprising at least one optical fiber, at least one strength component, at least one water-swellable component, and a jacket covering, the at least two fiber optic cables being manufactured by the process comprising the steps of:

providing the at least one optical fiber, the at least one strength component, and the at least one water-swellable component for each of the at least two independent fiber optic cables, wherein the at least one water-swellable component has a length that is longer than the at least one optical fiber;

extruding the jacket covering about the at least one optical fiber, the at least one strength component, and the at least one water-swellable component of each of the fiber optic cables simultaneously, the fiber optic cables being attached by a portion of the jacket covering and the jacket covering includes a weld line so that a weakened portion is formed for separating the fiber optic cables, wherein the step of extruding includes passing the optical fibers, strength components, and water-swellable component for each of the fiber optic cables through a single extrusion die; and separating the fiber optic cables along their length, thereby producing at least two independent fiber optic cables for use by the craft.

17. The at least two independent fiber optic cables according to claim 16, the at least two fiber optic cables being manufactured by the process that further comprises the step of providing a filling element to form a portion of a sacrificial web between the at least two independent fiber optic cables.

18. The at least two independent fiber optic cables according to claim 16, wherein each independent fiber optic cable includes at least one strength component and at least one strength member.

19. The at least two independent fiber optic cables according to claim 16, wherein the step of separating the fiber optical cables is performed at a separate location from the extruding step.

20. The at least two independent fiber optic cables according to claim 16, wherein the jacket covering connects more than two independent fiber optic cables.

* * * * *